United States Patent
Linker

[15] 3,667,083
[45] June 6, 1972

[54] WINDSHIELD WIPER ASSEMBLY

[72] Inventor: Roy E. Linker, Nursery Road, Titusville, N.J. 08560

[22] Filed: Aug. 28, 1970

[21] Appl. No.: 67,916

[52] U.S. Cl..................................15/250.42, 15/250.06
[51] Int. Cl. .........................................................B60s 1/38
[58] Field of Search ......................15/250.36, 250.42, 250.06

[56] References Cited

UNITED STATES PATENTS

| | | | |
|---|---|---|---|
| 2,746,077 | 5/1956 | Higgens | 15/250.06 X |
| 3,114,926 | 12/1963 | Deibel | 15/250.42 |
| 3,121,903 | 2/1964 | Ludwig | 15/250.42 |
| 3,263,262 | 8/1966 | Wise | 15/250.42 |
| 3,386,123 | 6/1968 | Oishei et al. | 15/250.42 |
| 3,408,680 | 11/1968 | Heller | 15/250.42 |
| 3,409,930 | 11/1968 | Linker | 15/250.06 |

FOREIGN PATENTS OR APPLICATIONS

| | | | |
|---|---|---|---|
| 1,446,657 | 6/1966 | France | 15/250.42 |

*Primary Examiner*—Peter Feldman
*Attorney*—Sperry and Zoda

[57] ABSTRACT

A windshield wiper assembly is provided with a wiper blade and a backing strip together with a blade retaining clip engaging the backing strip and connected to the blade to prevent movement of the blade with respect to the backing strip. For this purpose the clip preferably has a portion thereof located between the backing strip and blade and has prongs thereon which project into the material of which the blade is formed. The backing strip and/or the blade or both may b formed of extruded plastic material and in an alternative embodiment of the invention, the wiper blade has an electrical heating element carried thereby, whereas blade supporting members which are detachably connected to the backing strip form part of an electrical circuit including the heating element and blade retaining clip.

13 Claims, 10 Drawing Figures

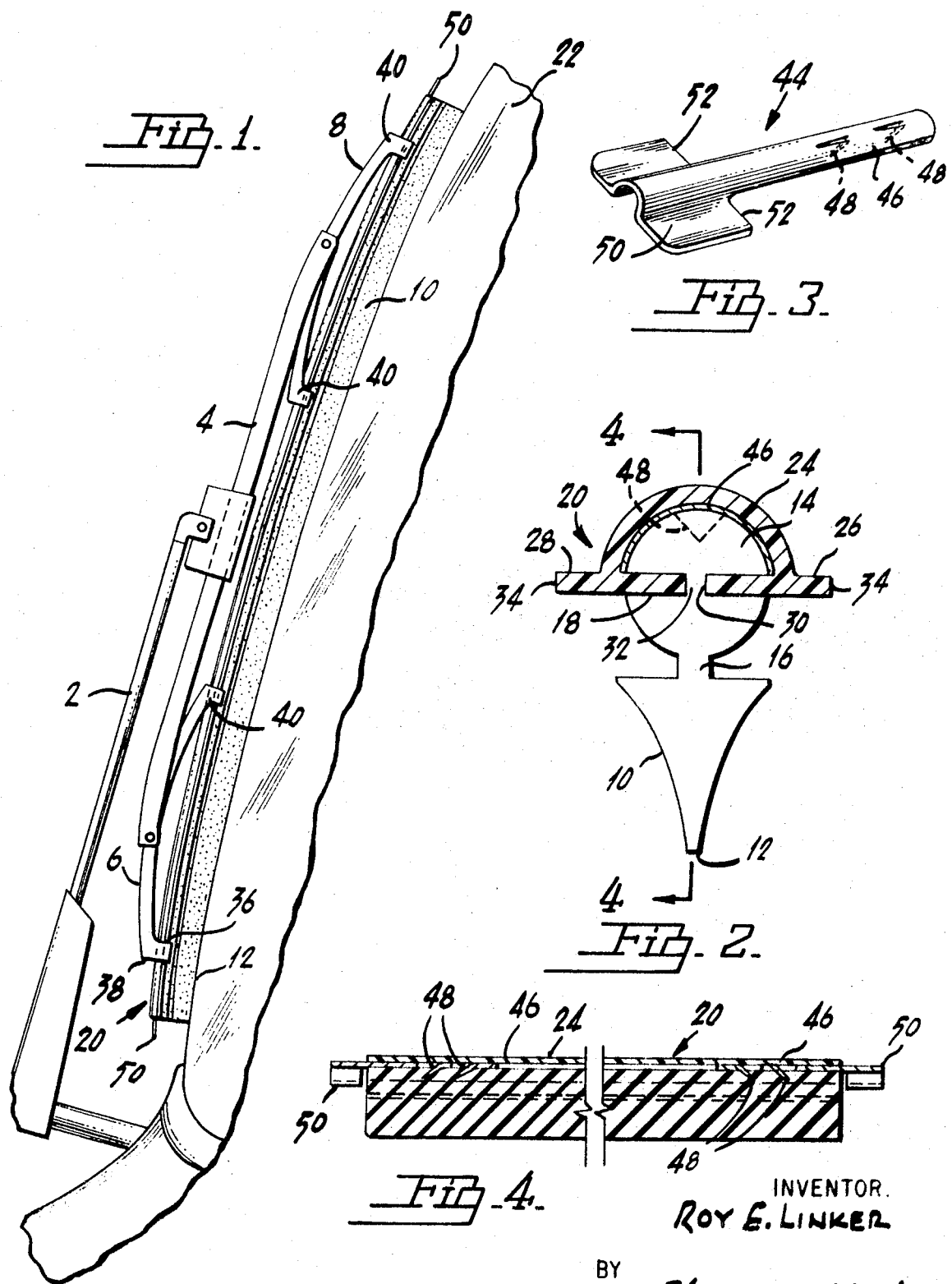

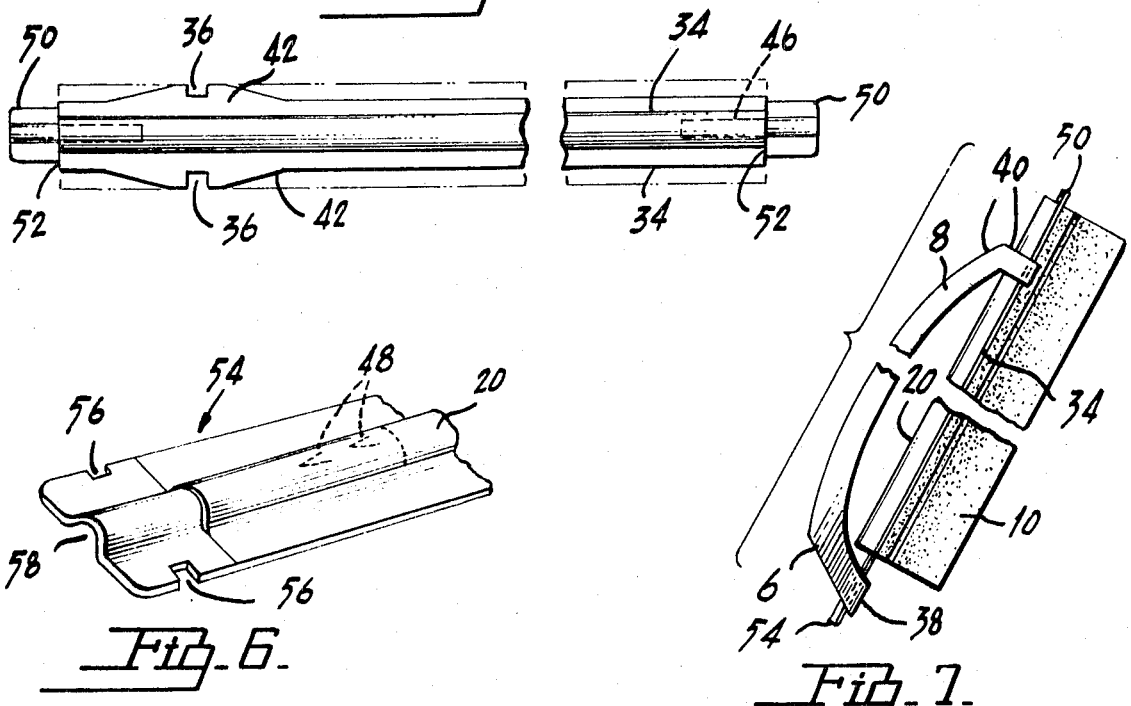
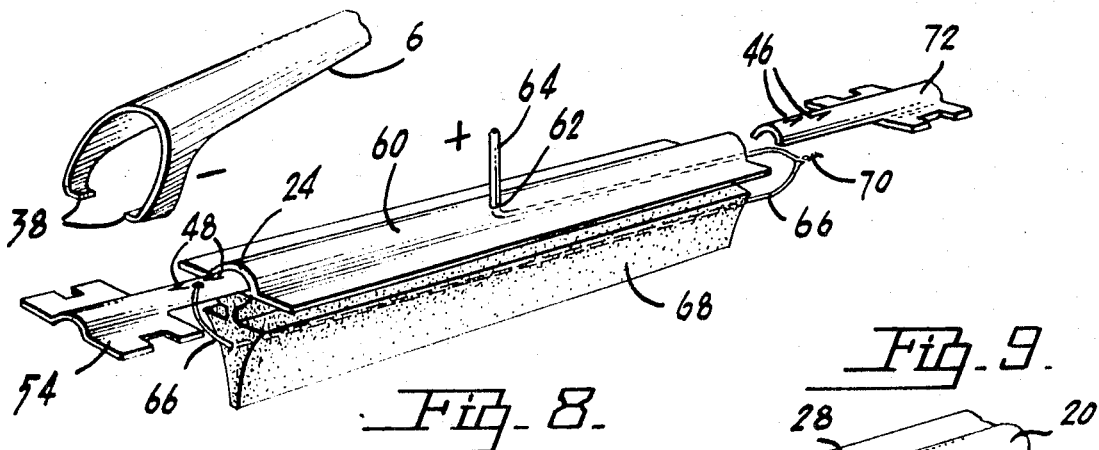
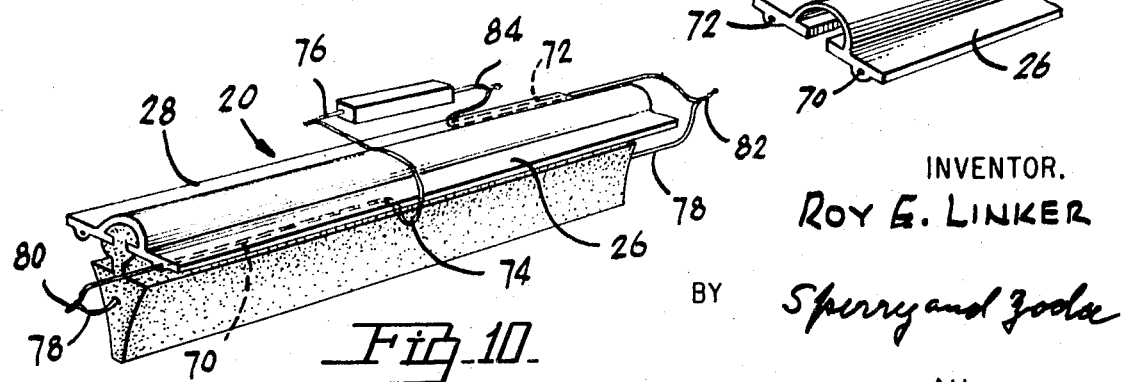
INVENTOR.
ROY E. LINKER
BY Sperry and Zoda
Attorneys

WINDSHIELD WIPER ASSEMBLY

FIELD OF INVENTION

This invention relates to windshield wiping assemblies which include a wiper blade and a backing strip for limiting flexing of the blade in a plane parallel to the surface of the windshield while permitting ready flexing of the blade in a direction normal to the surface of the windshield. The wiper blade is slidably received by the backing strip and in accordance with the present invention means engaging the wiper blade and backing strip prevent relative longitudinal movement of the blade with respect to the backing strip. The backing strip may be uniform in cross section throughout the length thereof so that it can be formed by extrusion and cut into any desired length required. The backing strip preferably has a cross-sectional form presenting a central arched portion adapted to extend over the head portion of a wiper blade and has flat portions presenting inner edges projecting inward from the central portion into grooves on opposite sides of the head portion of the blade and presenting outwardly projecting flanges detachably engageable by members for supporting and moving the blade. Furthermore, windshield wiper blades have heretofore been provided with heating elements for raising the temperature of the blade to aid in the removal of ice and snow from a windshield, as exemplified by applicant's issued U.S. Pat. Nos. 3,201,818; 3,408,678; 3,409,930; and copending application Ser. No. 780,612. In accordance with the certain embodiments of the present invention, the wiper blade is provided with a backing strip which if formed of electrically insulated material and an electrical circuit is provided for supplying current to the heating element of the wiper blade. The blade retaining clips may form a part of an electrical circuit including the blade supporting and moving members for energizing the electrical heating means for the windshield wiper blade.

THE DRAWINGS

FIG. 1 is a side elevation of a typical windshield wiper assembly embodying the present invention;

FIG. 2 is an enlarged transverse sectional view through the backing strip and blade of the assembly shown in FIG. 1;

FIG. 3 is a perspective of a blade retaining clip employed in the assembly of FIG. 1;

FIG. 4 is a longitudinal sectional view through the assembly shown in FIG. 2, taken on the line 4—4 thereof;

FIG. 5 is a top plan view of the assembly shown in FIG. 2;

FIG. 6 is a perspective view of an alternative form of clip, employed in an assembly embodying the present invention;

FIG. 7 is a side elevation showing the upper and lower ends of an assembly using the alternative clip of FIG. 7;

FIG. 8 is a perspective view of a further alternative embodiment of the present invention including a heated wiper blade;

FIG. 9 is a sectional view illustrating another modification of the present invention; and FIG. 10 is a perspective view showing an assembly in which the backing strip of FIG. 9 is used.

PREFERRED EMBODIMENT OF THE INVENTION

In that form of the invention chosen for purposes of illustration in the drawings the windshield wiper assembly has an actuating arm 2 adapted to be oscillated by suitable or conventional mechanism not shown. A holder 4 is carried by the free end of the arm 2 and provided with blade supporting members 6 and 8 pivotally connected to the holder 4 adjacent the opposite ends thereof.

The windshield wiper blade 10 may be of the type shown in issued U.S. Pat. Nos. 3,201,818 and 3,408,678 and is preferably provided with a wiping edge 12 connected to a head or retaining portion 14 by a flexible neck 16. The head portion of the blade has grooves 18 therein at opposite sides of the head permitting attachment of the blade to a backing strip 20 by relative sliding movement of the head 14 of the blade with respect to the backing strip 20. The backing strip 20 is relatively flexible in a plane normal to the surface of the windshield 22 but is relatively stiff in a plane parallel to the surface of the windshield whereby the backing strip serves to limit lateral flexing of the blade while allowing it to bend lengthwise to effectively wipe the surface of a curved windshield.

As shown in FIG. 2, the backing strip is in the form of an elongated member having a cross-sectional form presenting a centrally located arched portion 24 which extends across the head portion 14 of the blade and has its opposite sides connected to flat portions 26 and 28 which lie in substantially the same plane. The inner edges 30 of the flat portions 26 and 28 project inwardly from the side of the central arched portion and are spaced apart to form a slot 32 extending lengthwise of the backing strip so that the edges 30 extend into the grooves 18 on opposite sides of the head 14 of the wiper blade. The flat portions 26 and 28 of the backing strip also project outwardly beyond the central arched portion 24 of the strip so that they present flanges having the outer edges 34 thereof projecting beyond the outer sides of the central arched portion for connection to the blade supporting members 6 and 8 of the assembly. In producing the backing strip 20, it is preferred that it be formed of plastic material and that the material be extruded through a dye so as to form a strip of indeterminate length and of uniform cross section throughout the length thereof. The strip thus produced may then be cut into sections of any desired or selected length required for use in whatever size, length or type of windshield wiper assembly desired. The backing strip material is thus capable of use in producing backing strips to be employed with substantially any windshield wiper blade.

As indicated in FIG. 5 the extruded strip of plastic material may initially have a width as represented in dotted lines in FIG. 5 and its sides may thereafter be cut, trimmed or stamped to provide a section 42 of greater width than the remainder of the strip. Notches 36 can then be formed in the wider section 42 of the backing strip for receiving the inturned attaching members 38 adjacent the lower end of the pivoted blade supporting member 6 carried by the holder 4 of the assembly. The notches 36 are but little larger than the attaching members 38 on the lower end of the blade supporting member 6 whereby the backing strip and the blade carried thereby will be held against longitudinal movement with respect to the supporting members 6 and holder 4 of the assembly. However, the remaining attaching members 40 on the upper end of supporting member 6 and on supporting member 8 may loosely embrace the outer edges 34 of the flat portions 26 and 28 of the backing strip 20, so as to permit the upper portion of the assembled blade and backer to move longitudinally with respect to the holding means 40 whereby the blade and backer can flex readily to conform to the surface of a curved windshield.

In order to prevent relative longitudinal movement of the wiper blade 10 with respect to the backing strip 20, a blade retaining clip 44 is connected to the blade and backing strip. Thus, as shown in FIG. 3, the clip may be formed with a tongue 46 that is transversely arched or otherwise shaped to conform to the contour of the inner surface of the central portion 24 of the backing strip 20 and the upper surface of the head 14 of the windshield wiper blade 10. The tongue 46 of the clip further is provided with means for securely connecting the clip to the wiper blade. As shown, the tongue 46 of the clip is provided with downwardly projecting prongs 48 which are struck downwardly within the tongue 46 and inclined toward the outer end 50 of the clip. Therefore when the tongue 46 of clip 4 is inserted into the space between the arched portion of the backer and the head of the wiper blade, the prongs 48 will serve to deform the material of which the blade is formed and preferably will penetrate into the head 14 of the blade a sufficient distance to connect the clip securely to the blade and prevent withdrawal of the clip from the end of the backing strip 20. The outer end 50 of the blade retaining clip is wider than the central portion of the backing strip and presents shoulders 52 engageable with the end of the backing strip. Accordingly, when clips 44 are inserted into both ends of the backing strip 20, the blade and backing strip will be securely and positively connected together in a manner to prevent relative longitudinal movement thereof during use. Nevertheless, if it is desired to insert a new blade into the backing strip the retaining clips may be pulled out of the end of the strip by means of a pair of pliers or other tool and a new blade inserted into the old backing strip.

As shown in FIG. 6, a blade retaining clip 54 may be employed for insertion into one (or both) ends of the backer 20 and is provided with notches 56 in the opposite sides of the head 58 of the clip. These notches may receive the inturned attaching members 38 on the lower end of the blade supporting member 6, whereas the remaining attaching members on the upper end of supporting member 6 and the supporting member 8 may loosely embrace the outer edges 34 of the backing strip 20. The clip 54 then will serve to perform two functions in that it not only serves to connect the blade to the backing strip in a manner to prevent relative longitudinal movement thereof, but also is employed for connecting the assembled blade and backer to the blade supported means of the windshield wiper.

As shown in FIG. 1, the ends of the backing strip 20 and blade 10 extend beyond the ends of the upper and lower blade supporting members 6 and 8, and the assembly is held in position by attaching members 38 engaging notches 36 in the outer sides of the backer. On the other hand, when using the clip 54 of FIG. 6, the lower end of the assembled backing strip and blade will be located above the lower end of the supporting member 6 as shown in Fig. 7. The attaching members 38 on the lower end of the member 6 then engages the notches 56 in the clip 54 to hold the assembled blade and backer in place with respect to the member 6 and the remaining elements of the windshield wiper assembly. However, the upper end of the backing strip 20 projects beyond the upper end of the upper blade supporting member 8. The holding members 40 on the upper end of the holding member 6 and at both ends of the holding member 8 then merely embrace the outer edges 34 of the backing strip to hold the assembled backer and blade in place without restricting longitudinal movement of the backing and blade with respect to the supporting members. The blade retaining clip at the upper end of the backing strip 20 may then be of the type 44 shown in FIG. 3, or if desired may be of the type 54 shown in FIG. 6, since the notches 56 in the upper clip will not be engaged by any holding member.

In the alternative constructions shown in FIGS. 8 to 10, the windshield wiper blade carries an electrical heating element and may be of the type shown in applicant's issued U.S. Pat. Nos. 3,408,678 and 3,419,932 or copending application Ser. No. 780,612.

As shown in FIG. 8, the backing strip 60 is provided with an opening 62 near the center thereof through which an electrical conductor 64 may pass to the interior of the central arched portion 24 of the backer. The conductor 64 may be supplied with current from any suitable source and be connected into a circuit through a wire supported by the arm 2 or otherwise as desired. The conductor 64 extends from the opening 62 to one end of the assembled blade and backer between the head of the blade and the inner surface of the arched portion of the backing strip. The outer end of the conductor 64 is connected to an electrical heating element 66 carried by the blade 68 as shown at 70, for purposes of illustration. However, in most instances it is preferable to connect the end of conductor 64 and the end of the heating element 66 to a metal clip 72 of the type shown in FIG. 3 or FIG. 6. The conductors are then inserted through the openings in the tongue of the clip which are formed in striking down the retaining prongs 64 of the clip.

The lower end of the heating element 66 is connected in this manner to the clip 54 as shown in FIG. 8, whereas the circuit is completed by engagement of the attaching members 38 on blade supporting member 6, which serves as a ground or negative side of the circuit for energizing the heating element 66.

In the further alternative embodiment of the invention shown in FIG. 9, the flat portions 26 and 28 of the backing strip 20 have electrical conductors 70 and 72 embedded therein during the extrusion operation employed in forming the backing strip. As shown in FIG. 10, the conductor 70 on one side of the backer may then be pulled downward out of the side portion 26 for approximately one-half the length of the backer to provide an end 74 for connection to a wire 76 by which current can be supplied for energizing the heating element 78. The opposite end of the conductor 70 is then connected to the heating element 78 as indicated at 80. The upper end of heating element 78 is then connected to the conductor 72 as shown at 82 and the opposite end of conductor 72 is stripped from the side portion 28 of the backing strip and connected to a wire 84 for completing a circuit for energizing the heating element 78.

The various constructions of the present invention each include a novel type of backing strip and blade retaining clip, whereas the windshield wiper blades may be of various types and lengths as required in any particular assembly and may embody an electrical heating element if desired.

I claim:

1. A windshield wiper assembly including a wiper blade having one longitudinal edge thereof engageable with a windshield and an opposite longitudinal edge provided with a head, a backer strip for said blade having a central portion extending over the head of the blade, and separately formed blade retaining means located between said central portion of the backer strip and the head of the blade and serving to prevent longitudinal movement of the blade with respect to the backer strip.

2. An assembly as defined in claim 1 wherein said blade retaining means has projections thereon which are inclined toward the end of the blade and engage the blade to deform the material of which the blade is formed.

3. An assembly as defined in claim 1 wherein the blade is provided with a head portion which is rounded in cross-section, the backer is formed with a centrally arched portion in which the head portion of the blade is slidably received, and the blade retaining means has an arched portion disposed between the head portion of the blade and the arched portion of the backer strip.

4. An assembly as defined in claim 3 wherein the arched portion of the blade retaining means has prongs thereon inclined downwardly toward the end of the blade and projecting into the head portion of the blade.

5. An assembly as defined in claim 1 wherein the windshield wiper blade has an electrical heating element carried thereby and the backing strip has electrically conducting means carried thereby and connected to said heating element for supplying current to said element.

6. The combination as defined in claim 5 wherein said electrically conducting means is located on the inner surface of the central arched portion of the strip.

7. An assembly as defined in claim 1 wherein said windshield wiper blade has an electrical heating element carried thereby, said blade retaining means is formed of electrically conducting material, and an electrical circuit for supplying current to said heating element includes said blade retaining means.

8. The combination as defined in claim 1 wherein the windshield wiper blade has an electrical heating element carried thereby, blade supporting means are separably connected to the backing strip, and said blade supporting means, and electrical heating elements form parts of an electrical circuit for energizing said heating element.

9. The combination as defined in claim 8, wherein a blade retaining clip engages the wiper blade and backing strip and forms a part of said electrical circuit.

10. An assembly comprising a windshield wiper blade and a backing strip therefor, said blade having a head portion provided with longitudinally extending slots in opposite sides thereof, said backing strip consisting of an elongated member having a central portion formed to extend over the head portion of the blade and having side portions which project inwardly from the central portion of the backing strip and are located in the slots in the opposite sides of the head portion of the blade, said side portions also projecting outwardly from the central portion of the backing strip so as to present flanges at opposite sides of the assembly, and separately formed blade retaining means inserted between the head portion of said blade and the central portion of said backing strip for preventing relative longitudinal movement of the blade and backing strip.

11. An assembly as defined in claim 10 wherein said flanges have notches therein for receiving attaching members as blade supporting means.

12. An assembly as defined in claim 10 wherein said blade retaining means is provided with notches for receiving attaching members of blade supporting means.

13. An assembly as defined in claim 1 wherein said blade retaining means is provided with means for use in attaching said assembly to blade supporting and moving means.

* * * * *